United States Patent
Na et al.

(10) Patent No.: US 10,816,100 B2
(45) Date of Patent: Oct. 27, 2020

(54) SEALING MEMBER FOR A MULTI-DIRECTION CHANGEOVER VALVE AND A MULTI-DIRECTION CHANGEOVER VALVE INCLUDING THE SEALING MEMBER

(71) Applicants: HYUNDAI MOTOR COMPANY, Seoul (KR); KIA MOTORS CORPORATION, Seoul (KR)

(72) Inventors: Sung Wook Na, Yongin-si (KR); Hun Woo Park, Namyangju-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/355,010

(22) Filed: Mar. 15, 2019

(65) Prior Publication Data
US 2020/0141501 A1    May 7, 2020

(30) Foreign Application Priority Data
Nov. 5, 2018  (KR) ......................... 10-2018-0134715

(51) Int. Cl.
| F16K 11/085 | (2006.01) |
| F16K 5/18 | (2006.01) |
| F16K 5/06 | (2006.01) |
| F16K 27/06 | (2006.01) |

(52) U.S. Cl.
CPC .......... *F16K 11/085* (2013.01); *F16K 5/0689* (2013.01); *F16K 5/18* (2013.01); *F16K 27/065* (2013.01)

(58) Field of Classification Search
CPC ........ F16K 11/085; F16K 5/18; F16K 27/065; F16K 5/0673; F16K 5/0678; F16K 5/0689
USPC ........................... 251/314–317.01, 174, 192, 251/315.01–315.16
See application file for complete search history.

(56) References Cited

U.S. PATENT DOCUMENTS

| 2,373,628 | A | * | 4/1945 | Gleeson | ................ | F16K 5/0678 251/315.01 |
| 3,083,725 | A | * | 4/1963 | Moen | ..................... | F16K 5/0689 137/454.2 |
| 3,118,650 | A | * | 1/1964 | Cooper | ................. | F16K 5/0678 251/172 |
| 3,252,684 | A | * | 5/1966 | Ksieski | ................. | F16K 5/0668 251/172 |
| 3,356,337 | A | * | 12/1967 | Olen | ..................... | F16K 5/0631 251/315.13 |

(Continued)

FOREIGN PATENT DOCUMENTS

| KR | 101804764 | 12/2017 |
| KR | 101864641 | 6/2018 |

*Primary Examiner* — John Bastianelli
(74) *Attorney, Agent, or Firm* — Lempia Summerfield Katz LLC (57) ABSTRACT

A sealing member of a multi-direction changeover valve for maintaining air-tightness between an orifice formed in a valve body rotatably installed in a valve housing and a port through which fluid flows into or out of the valve housing. The sealing member includes an annular seal part and an annular frame inserted into the seal part to support the seal part such that the seal part is brought into close contact with an inner circumferential surface of the port.

11 Claims, 5 Drawing Sheets

(56) References Cited

U.S. PATENT DOCUMENTS

| | | | | |
|---|---|---|---|---|
| 3,486,733 A | * | 12/1969 | Gordon, Jr. | F16K 5/0673 |
| | | | | 251/172 |
| 3,610,575 A | * | 10/1971 | Yoneda | F16K 5/0673 |
| | | | | 251/315.05 |
| 4,345,738 A | * | 8/1982 | Ripert | F16K 5/0631 |
| | | | | 137/72 |
| 4,494,730 A | * | 1/1985 | George | F16K 27/062 |
| | | | | 251/309 |
| 4,552,335 A | * | 11/1985 | Alexander | F16K 5/0673 |
| | | | | 251/315.05 |
| 4,671,308 A | * | 6/1987 | Williams | F16K 5/0626 |
| | | | | 137/72 |
| 8,500,090 B2 | * | 8/2013 | Hubacek | F16K 5/20 |
| | | | | 251/171 |
| 2018/0051815 A1 | | 2/2018 | Murakami | |

* cited by examiner

SEALING MEMBER FOR A MULTI-DIRECTION CHANGEOVER VALVE AND A MULTI-DIRECTION CHANGEOVER VALVE INCLUDING THE SEALING MEMBER

CROSS-REFERENCE TO RELATED APPLICATION

This application claims the benefit of priority to Korean Patent Application No. 10-2018-0134715, filed in the Korean Intellectual Property Office on Nov. 5, 2018, the entire contents of which are incorporated herein by reference.

BACKGROUND

Technical Field

The present disclosure relates to a sealing member for a multi-direction changeover valve and a multi-direction changeover valve including the sealing member.

Description of the Related Art

Vehicles generally include various types of valves. These valves distribute, control, or interrupt the flow of various types of fluids according to the intended uses of the fluids, such as cooling an engine, cooling and heating an indoor space, exhaust gas recirculation (an EGR system), and the like.

A rotary valve is an example of a valve among the various types of valves found in vehicles. The rotary valve includes a valve housing having two or more ports and a valve body for selectively opening or closing the two or more ports by rotating about a rotary shaft inside the valve housing. The rotary valve is mainly used in a cooling water circuit of an internal combustion engine.

For air-tightness between the valve body and the ports, a sealing member is generally mounted in the ports.

The sealing member includes a seal part made of an elastic material, such as rubber, to improve the air-tightness. However, as the valve is used for a long period of time, the seal part may be deformed or damaged due to heat or pressure. The sealing performance of the sealing member may be degraded due to the deformation or damage, consequently causing fluid leakage.

SUMMARY

The present disclosure has been made to solve the above-mentioned problems occurring in the prior art while advantages achieved by the prior art are maintained intact.

An aspect of the present disclosure provides a sealing member for a multi-direction changeover valve, which has an improved sealing function and a more simplified structure, and a multi-direction changeover valve including the sealing member.

Another aspect of the present disclosure is to effectively maintain air-tightness between a valve body and a port even though the valve is used for a long period of time.

Another aspect of the present disclosure is to facilitate manufacturing and mounting of the sealing member that is capable of performing the above-described functions.

The technical problems to be solved by the present disclosure are not limited to the aforementioned problems. Any other technical problems not mentioned herein will be clearly understood from the following description by those having ordinary skill in the art to which the present disclosure pertains.

According to an aspect of the present disclosure, a sealing member of a multi-direction changeover valve for maintaining air-tightness between an orifice formed in a valve body rotatably installed in a valve housing and a port, through which fluid flows into or out of the valve housing, includes an annular seal part and an annular frame inserted into the seal part to support the seal part such that the seal part is brought into close contact with an inner circumferential surface of the port.

According to another aspect of the present disclosure, a multi-direction changeover valve includes a valve housing having at least two ports through which fluid flows into or out of the valve housing, a valve body that is rotatably installed in the valve housing and that selectively opens or closes the ports, and a sealing member mounted between each of the ports and the valve body such that at least a portion of the sealing member is brought into close contact with the valve body to maintain air-tightness between the valve body and the port.

The sealing member includes an annular seal part and an annular frame inserted into the seal part to support the seal part such that the seal part is brought into close contact with an inner circumferential surface of the port.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component. The substance, sequence, order, or number of these components is not limited by these terms. If a component were described as "connected", "coupled", or "linked" to another component, they may mean the components are not only directly "connected", "coupled", or "linked" but also are indirectly "connected", "coupled", or "linked" via a third component.

Figure 1:
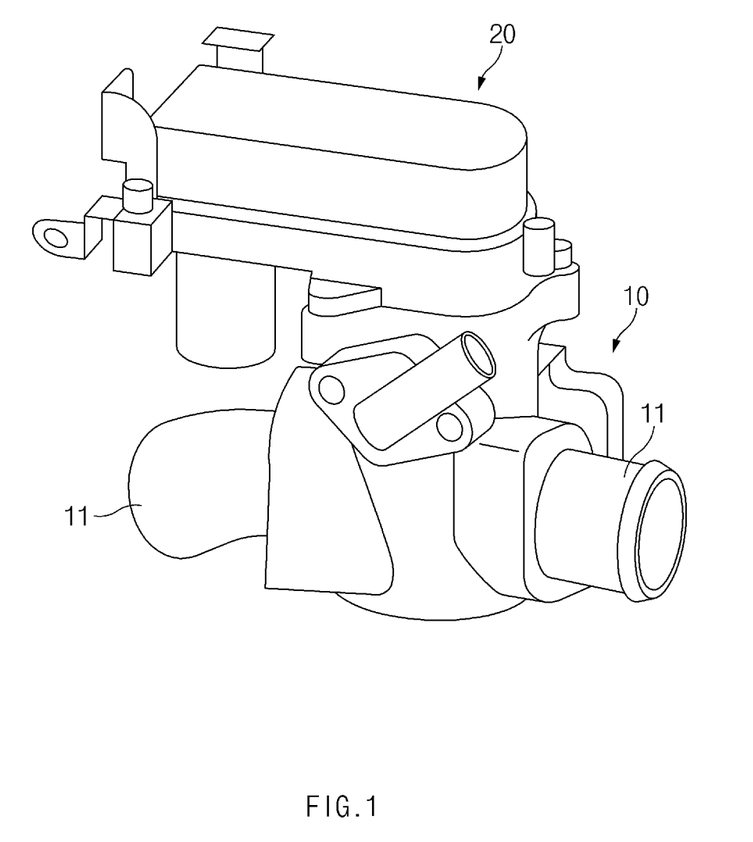
FIG. 1 is a perspective view illustrating a multi-direction changeover valve according to an embodiment of the present disclosure.
Figure 2:
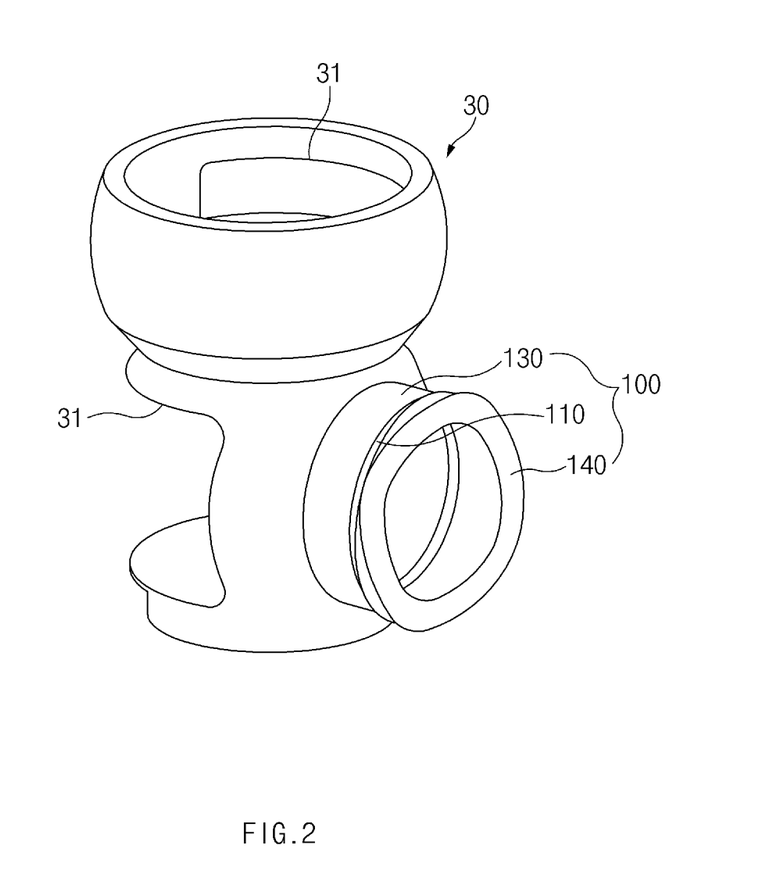
FIG. 2 is a perspective view illustrating a part of the configuration of the multi-direction changeover valve according to an embodiment of the present disclosure.
Figure 3:
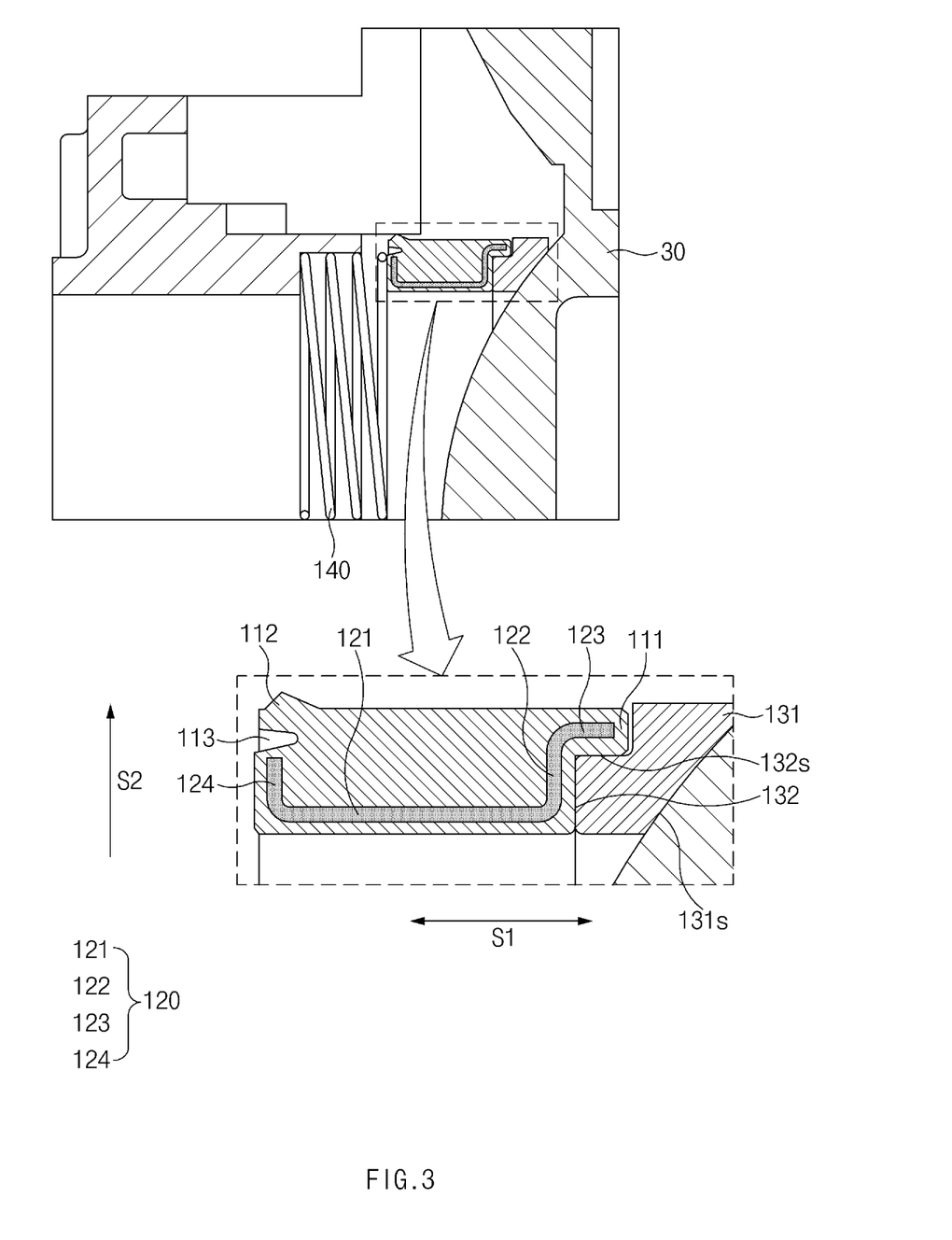
FIG. 3 is a sectional view illustrating the multi-direction changeover valve of FIG. 1.

FIG. 1 is a perspective view illustrating a multi-direction changeover valve according to an embodiment of the present disclosure. FIG. 2 is a perspective view illustrating a part of the configuration of the multi-direction changeover valve according to an embodiment of the present disclosure. FIG. is a sectional view illustrating the multi-direction changeover valve of FIG. 1.

The multi-direction changeover valve according to this embodiment includes a valve housing 10, a valve actuator 20, a valve body 30, and a sealing member 100.

Referring to FIG. 1, the valve housing 10 has a space with a length therein, which is filled with a fluid, and a plurality of ports 11 through which the fluid flows into or out of the valve housing 10.

For example, the plurality of ports 11 may be formed at opposite ends of the valve housing 10.

The valve actuator 20 may include a motor and may provide a driving force to rotate the valve body 30.

For example, the valve actuator 20 may include a shaft (not illustrated) that is connected to the valve body 30 and a drive motor that drives the shaft.

Referring to FIGS. 2 and 3, the valve body 30 may have a hollow shape and may be mounted in the inner space of the valve housing 10 so as to be rotatable.

The valve body 30 may have orifices 31 corresponding to the ports 11 of the valve housing 10 and may open or close the ports 11 while connecting the orifices 31 and the ports 11 by rotation.

The sealing member 100 may maintain the air-tightness between the orifice 31 formed in the valve body 30 and the port 11 through which the fluid flows into or out of the valve housing 10.

Referring to FIG. 3, the sealing member 100 may include a seal part 110 and a frame 120.

The seal part 110 may have an annular shape.

The frame 120 may support the seal part 110 to bring the seal part 110 into close contact with the inner circumferential surface of the port 11. The frame 120 may be inserted into the seal part 110. The frame 120 may have an annular shape.

In the related art, even though a sealing member is used for a port of a multi-direction changeover valve, the sealing member is deformed by heat as time passes, thereby degrading the sealing function. The sealing member in the related art includes a retainer, a sealing part, a valve seat, and an elastic member. In this case, the sealing part deforms as time passes. The gap between the retainer and the sealing part or the gap between the sealing part and the valve seat gradually increases to cause cooling water leakage.

The sealing member 100 according to this embodiment is basically characterized by including the annular frame 120 inserted into the seal part 110 to support the seal part 110 such that the seal part 110 is brought into close contact with the inner circumferential surface of the port 11, thereby improving a sealing function and simplifying the structure.

Features of the sealing member 100 according to this embodiment will be described below in more detail.

Referring to FIGS. 2 and 3, the sealing member 100 may include the seal part 110, the frame 120, a valve seat 130, and an elastic member 140. In some embodiments, the sealing member 100 may not include some of the components mentioned above, but includes the seal part 110 and the frame 120.

Seal Part 110

Figure 4:
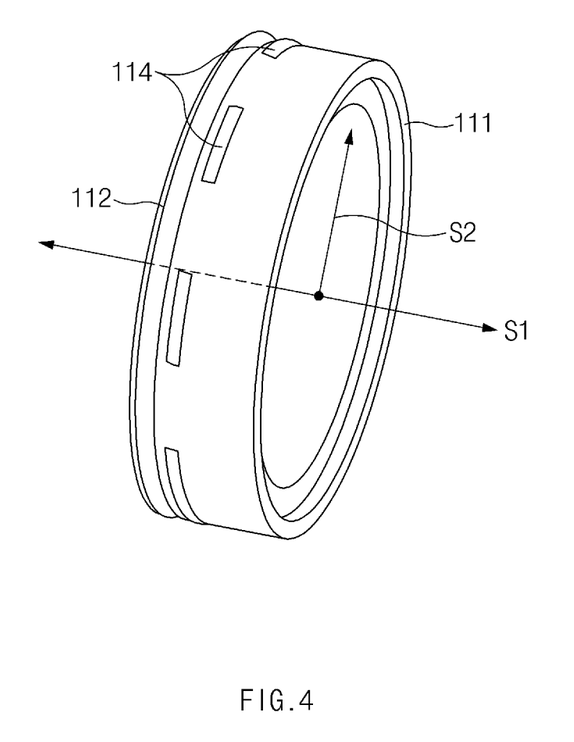
FIG. 4 is a perspective view illustrating a seal part of a sealing member of the multi-direction changeover valve according to an embodiment of the present disclosure.

FIG. 4 is a perspective view illustrating the seal part of the sealing member of the multi-direction changeover valve according to an embodiment of the present disclosure.

Referring to FIGS. 3 and 4, the seal part 110 may have an annular shape that extends a predetermined length in the central axis direction S1. The seal part 110 may have a donut shape with a predetermined thickness in the radial direction S2. That is, the seal part 110 may have a substantially hollow cylindrical shape.

The seal part 110 may be formed of an elastically deformable material, such as rubber.

The seal part 110 may have, at one end thereof in the central axis direction S1, a valve seat insertion portion 111 into which the valve seat 130 is inserted.

The valve seat insertion portion 111 may have a larger inner diameter than the other portions of the seal part 110. The valve seat insertion portion 111 may have a space into which a portion of the valve seat 130 is inserted.

The seal part 110 may have a lip seal 112 at an opposite end thereof with respect to the central axis direction S1, which is opposite to the one end at which the valve seat insertion portion 111 is located.

The lip seal 112 may improve the air-tightness between the seal part 110 and the port 11. The lip seal 112 may protrude from the outer circumferential surface of the seal part 110 toward the port 11.

The lip seal 112 may be formed in an annular shape at a location adjacent to the opposite end of the seal part 110. That is, the lip seal 112 may protrude from a location adjacent to one of the opposite ends of the seal part 110 in the circumferential direction.

The seal part 110 may have a depression 113 formed in one end portion where the lip seal 112 is located. The depression 113 may be concave toward the inside of the seal part 110.

The depression 113 may be formed on one side surface of the seal part 110 so as to be located radially inward of the lip seal 112. Referring to FIG. 3, the depression 113, which is formed in the one end portion of the seal part 110, may be recessed to a predetermined depth in the central axis direction S1. The depression 113 may have a gradually decreasing width with an increase in depth from the one side surface of the seal part 110 in the central axis direction S1.

The seal part 110 including the depression 113 may allow the lip seal 112 to be elastically deformed in the radially inward direction. That is, the sealing member 100 may be easily mounted in the port 11 since the depression 113 enables the lip seal 112 to be elastically deformed in the radially inward direction when the seal part 110 is inserted into the port 11. Furthermore, the air-tightness between the sealing member 100 and the port 11 may be improved by the lip seal 112 after the sealing member 100 is mounted in the port 11.

The seal part 110 may further include a plurality of protrusions 114 on the outer circumferential surface thereof. The plurality of protrusions 114 may protrude from the outer circumferential surface of the seal part 110 toward the inner circumferential surface of the port 11. The plurality of protrusions 114 may be formed on the outer circumferential surface of the seal part 110 in the circumferential direction. The coupling force between the seal part 110 and the port 11 may be enhanced by the plurality of protrusions 114.

Frame 120

Figure 5:
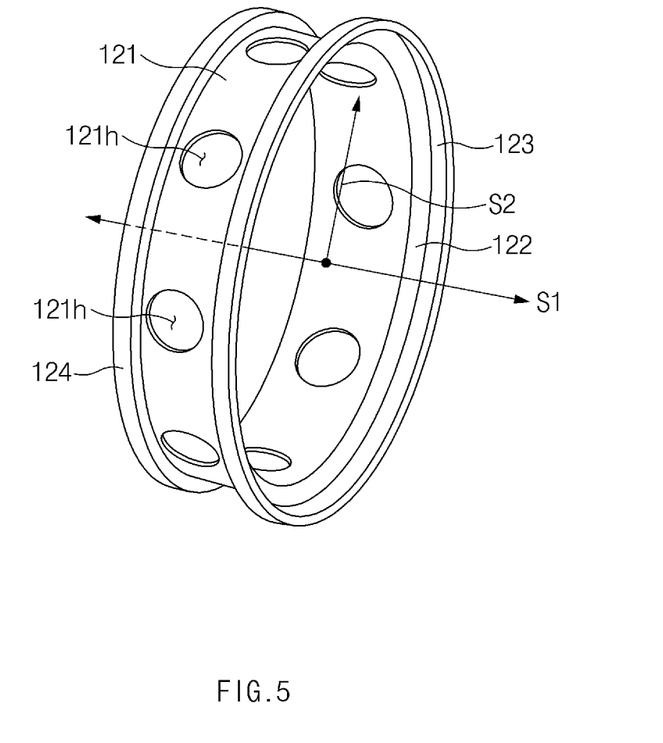
FIG. 5 is a perspective view illustrating a frame of the multi-direction changeover valve according to an embodiment of the present disclosure.

FIG. 5 is a perspective view illustrating the frame of the multi-direction changeover valve according to an embodiment of the present disclosure.

The frame 120 may extend a predetermined length in the central axis direction S1. One end or opposite ends of the frame 120 with respect to the central axis direction S1 may be bent in the radial direction S2.

Referring to FIGS. 2 and 5, the frame 120 may function as a support that is inserted into the seal part 110 to support the seal part 110. The frame 120 may be formed of metal or metal alloy that is not easily deformed by external force compared with the seal part 110.

Referring to FIG. 3, the frame 120 may include an extension 121, a valve seat support portion 122, a valve seat outside support portion 123, and a spring support portion 124. In some embodiments, the frame 120 may omit one or more of the valve seat support portion 122, the valve seat outside support portion 123, and the spring support portion 124, but includes the extension 121.

The extension 121 may extend in the central axis direction S1 so as to be adjacent to the inner circumference of the seal part 110. That is, the extension 121 may have a ring shape that extends along the inner circumferential surface of the seal part 110.

Although the extension 121 in this embodiment extends in a direction corresponding to the central axis direction S1, the extension 121 may extend in a direction between the central axis direction S1 and the radial direction S2 according to another embodiment.

That is, the direction in which the extension 121 extends includes a component of the central axis direction S1 and may further include a component of the radially inward direction or the radially outward direction.

The extension 121 may have a predetermined thickness in the radial direction S2.

Referring to FIG. 5, the extension 121 may have a plurality of insert holes 121h formed therein.

The plurality of insert holes 121h may be formed through the extension 121 in the radial direction S2. The plurality of insert holes 121h may have a circular shape to prevent stress concentration on any one portion thereof.

The plurality of insert holes 121h may be spaced circumferentially apart from each other by a predetermined angle.

The seal part 110 may surround the frame 120 while filling the plurality of insert holes 121h.

Accordingly, the coupling force between the frame 120 and the seal part 110 may be enhanced. That is, the position of the frame 120 may be more firmly fixed in the seal part 110 with respect to the central axis direction S1 and the radial direction S2. Therefore the frame 120 may effectively suppress overall deformation of the seal part 110 when the seal part 110 is deformed by an external force. Furthermore, a portion between the frame 120 and the outer surface of the seal part 110 may elastically deform to improve the air-tightness between the seal part 110 and another member.

The valve seat support portion 122 may extend in the radially outward direction from an end portion of the extension 121 that is adjacent to the valve seat 130.

While FIG. 3 illustrates an example that the valve seat support portion 122 extends outward in the radial direction S2, the valve seat support portion 122 may extend in a direction between the radially outward direction and the central axis direction S1. That is, the direction in which the valve seat support portion 122 extends includes a component of the radially outward direction and may further include a component of the central axis direction S1.

The valve seat support portion 122 may have a shape that corresponds to the shape of one end of the seal part 110 in contact with the valve seat 130.

In this embodiment, the seal part 110 and the valve seat 130 may have a contact surface that extends in the radial direction S2 and the circumferential direction. The valve seat support portion 122 may also have a shape that extends in the radial direction S2 and the circumferential direction.

The above-configured valve seat support portion 122 may support the one end of the seal part 110 in contact with the valve seat 130 to prevent the seal part 110 from being deformed. That is, deformation of the seal part 110 may be restricted by the valve seat support portion 122 of the frame 120 when the one end of the seal part 110 is pressed by the valve seat 130. Therefore, the air-tightness between the seal part 110 and the valve seat 130 may be improved.

The valve seat outside support portion 123 may extend from a radially outside end of the valve seat support portion 122 in the central axis direction S1. That is, the extension 121, the valve seat support portion 122, and the valve seat outside support portion 123 may form an "S" shape or a step shape as a whole.

The valve seat outside support portion 123 may be inserted into the valve seat insertion portion 111 of the seal part 110. Accordingly, the valve seat outside support portion 123 may reinforce the valve seat insertion portion 111 of the seal part 110.

The valve seat insertion portion 111 may surround an opposite end portion 132 of the valve seat 130 on the outside in the radial direction S2. The valve seat insertion portion 111 may support the opposite end portion 132 of the valve seat 130 in the radially inward direction. The valve seat insertion portion 111 may be deformed in the radially outward direction by a force exerted by the valve seat 30. However, the valve seat insertion portion 111 may be prevented from being deformed in the radially outward direction since the valve seat outside support portion 123 of the frame 120 is inserted into the valve seat insertion portion 111. That is, the air-tightness between the valve seat insertion portion 111 of the seal part 110 and the opposite end portion 132 of the valve seat 130 may be improved by the valve seat outside support portion 123.

The spring support portion 124 may extend from one end of the extension 121 of the frame 120 in the radial direction S2. The spring support portion 124 may support the one end portion of the seal part 110 that is pressed by the elastic member 140.

The spring support portion 124 may extend in the radially outward direction from an end portion of the extension 121 that is adjacent to the elastic member 140.

While FIG. 3 illustrates an example that the spring support portion 124 extends outward in the radial direction S2, the spring support portion 124 may extend in a direction between the radially outward direction and the central axis direction S1. That is, the direction in which the spring support portion 124 extends includes a component of the radially outward direction and may further include a component of the central axis direction S1.

The spring support portion 124 may have a shape that corresponds to the shape of one end of the seal part 110 in contact with the elastic member 140.

In this embodiment, the seal part 110 and the elastic member 140 may have a contact surface that extends in the radial direction S2 and the circumferential direction. The spring support portion 124 may also have a shape that extends in the radial direction S2 and the circumferential direction.

The above-configured spring support portion 124 may support the one end of the seal part 110 in contact with the elastic member 140 to prevent the seal part 110 from being deformed. That is, deformation of the seal part 110 may be restricted by the spring support portion 124 of the frame 120 when the one end of the seal part 110 is pressed by the elastic member 140. Therefore, the contact surfaces of the seal part 110 and the elastic member 140 may be prevented from being misaligned.

Referring to FIG. 3, the spring support portion 124 may extend from the one end of the extension 121 toward the depression 113 so as not to reach the depression 113.

The valve seat 130 may be brought into close contact with the valve body 30 to maintain the air-tightness around the orifice 31 formed in the valve body 30, as shown in FIG. 2. The valve seat 130 may have an annular shape.

The valve seat 130 may be formed of a material with low strain to prevent deformation caused by pressure or heat. For example, the valve seat 130 may be formed of Teflon.

For close contact with the valve body 30, the valve seat 130 may have a valve body seating surface 131s with a shape corresponding to the valve body 30.

The valve seat 130 may have a stepped outer circumferential surface. One end portion 131 of the valve seat 130 in contact with the valve body 30 may have a larger outer diameter than the opposite end portion 132 of the valve seat 130 in contact with the seal part 110.

The opposite end portion 132 of the valve seat 130 may be inserted into and seated in the valve seat insertion portion 111 of the seal part 110.

The opposite end portion 132 of the valve seat 130 may be supported in the radially inward direction by the valve seat insertion portion 111 on the outer circumferential surface thereof. The opposite end portion 132 of the valve seat 130 may be press-fit into the valve seat insertion portion 111.

The one end portion 131 and the opposite end portion 132 of the valve seat 130 may form a step shape to provide a step portion 132s of the valve seat 130 on which the valve seat insertion portion 111 of the seal part 110 is seated.

The elastic member 140 may be mounted in the port 11 and may elastically support the seal part 110 toward the valve body 30. For example, the elastic member 140 may be formed of a wave spring. Any elastic member capable of elastically supporting the seal part 110 toward the valve body 30 in the central axis direction S1 may be used as the elastic member 140 without any specific limitation in type.

According to the embodiments of the present disclosure, at least the following effects are achieved.

The annular frame is inserted into the seal part to support the seal part such that the seal part is brought into close contact with the inner circumferential surface of the port, whereby the structure of the multi-direction changeover valve may be further simplified.

Furthermore, the air-tightness between the valve body and the ports may be effectively maintained even though the multi-direction changeover valve is used for a long period of time.

In addition, manufacturing and mounting of the sealing member may be facilitated.

Effects of the present disclosure are not limited to the aforementioned effects. Any other effects not mentioned herein will be clearly understood from the accompanying claims by those having ordinary skill in the art to which the present disclosure pertains.

Although the present disclosure has been described with reference to embodiments and the accompanying drawings hereinabove, the present disclosure is not limited thereto and may be variously modified and altered by those having ordinary skill in the art to which the present disclosure pertains without departing from the spirit and scope of the present disclosure claimed in the following claims.

What is claimed is:

1. A sealing member of a multi-direction changeover valve for maintaining air-tightness between an orifice formed in a valve body rotatably installed in a valve housing and a port through which fluid flows into or out of the valve housing, the sealing member comprising:
    an annular seal part; and
    an annular frame inserted into the seal part to support the seal part such that the seal part is brought into close contact with an inner circumferential surface of the port,
    wherein, to increase a coupling force between the annular frame and the annular seal part, the annular frame includes a plurality of insert holes formed therein in a circumferential direction,
    wherein the annular seal part surrounds the annular frame while filling the plurality of insert holes,
    wherein the annular seal part extends a predetermined length in a central axis direction,
    wherein the annular frame includes an extension extending a predetermined length in the central axis direction, and
    wherein the plurality of insert holes are formed through the extension in a radial direction.

2. A multi-direction changeover valve comprising:
    a valve housing having at least two ports through which fluid flows into or out of the valve housing;
    a valve body rotatably installed in the valve housing and having an orifice; and
    a sealing member mounted between one of the at least two ports and the orifice of the valve body such that at least a portion of the sealing member is brought into close contact with the valve body to maintain air-tightness between the orifice of the valve body and the one of the at least two ports,
    wherein the sealing member includes an annular seal part, an annular frame inserted into the annular seal part to support the annular seal part such that the annular seal part is brought into close contact with an inner circumferential surface of the one of the at least two ports, and an annular valve seat brought into close contact with the valve body to maintain the air-tightness around the orifice,
    wherein the annular valve seat has a stepped outer circumferential surface and one end portion of the annular valve seat in contact with the valve body has a larger outer diameter than an opposite end portion of the annular valve seat in contact with the annular seal part,
    wherein the annular seal part has, at one end, a valve seat insertion portion into which the opposite end portion of the annular valve seat is inserted such that the opposite end portion of the annular valve seat is supported by the valve seat insertion portion in a radially inward direction, and
    wherein the annular frame includes an extension that extends in the central axis direction so as to be adjacent to an inner circumference of the annular seal part and a valve seat support portion that extends in a radially outward direction from one end of the extension that is adjacent to the annular valve seat.

3. A sealing member of a multi-direction changeover valve for maintaining air-tightness between an orifice formed in a valve body rotatably installed in a valve housing and a port through which fluid flows into or out of the valve housing, the sealing member comprising:

an annular seal part;

an annular frame inserted into the seal part to support the seal part such that the seal part is brought into close contact with an inner circumferential surface of the port; and an annular valve seat brought into close contact with the valve body to maintain the air-tightness around the orifice, wherein the annular valve seat has a stepped outer circumferential surface and one end portion of the annular valve seat in contact with the valve body has a larger outer diameter than an opposite end portion of the annular valve seat in contact with the annular seal part, wherein the annular seal part has, at one end, a valve seat insertion portion into which the opposite end portion of the annular valve seat is inserted such that the opposite end portion of the annular valve seat is supported by the valve seat insertion portion in a radially inward direction, and wherein the annular frame includes an extension that extends in the central axis direction so as to be adjacent to an inner circumference of the annular seal part and a valve seat support portion that extends in a radially outward direction from one end of the extension that is adjacent to the annular valve seat.

4. The sealing member of claim 3, wherein the annular frame is wholly inserted into the seal part.

5. The sealing member of claim 3, wherein the annular seal part extends a predetermined length in a central axis direction, and wherein the annular frame extends a predetermined length in the central axis direction and at least one end of the annular frame with respect to the central axis direction is bent in a radial direction.

6. The sealing member of claim 5, wherein the annular seal part is elastically supported toward the valve body by an elastic member mounted in the port, and wherein the annular frame includes an extension extending in the central axis direction so as to be adjacent to an inner circumference of the seal part and an elastic member support portion extending from one end of the extension in the radial direction to reinforce one side end of the annular seal part that is pressed by the elastic member.

7. The sealing member of claim 3, wherein the annular frame further includes a valve seat outside support portion extending from a radially outside end of the valve seat support portion in the central axis direction, and wherein the valve seat outside support portion is inserted into the valve seat insertion portion of the annular seal part to reinforce the valve seat insertion portion of the annular seal part.

8. The sealing member of claim 3, wherein to increase a coupling force between the annular frame and the annular seal part, the annular frame comprises a plurality of insert holes formed therein in a circumferential direction, and wherein the annular seal part surrounds the annular frame while filling the plurality of insert holes.

9. The sealing member of claim 8, wherein the annular seal part extends a predetermined length in a central axis direction, wherein the annular frame includes an extension extending a predetermined length in the central axis direction, and wherein the plurality of insert holes are formed through the extension in a radial direction.

10. The sealing member of claim 3, wherein the annular seal part includes a lip seal protruding from an outer circumferential surface of the annular seal part toward the port to increase air-tightness between the annular seal part and the port.

11. The sealing member of claim 10, wherein the lip seal is adjacent to one end of the annular seal part and has an annular shape, and wherein to allow the lip seal to be elastically deformed in a radially inward direction, an annular depression is formed on one side surface of the annular seal part so as to be located radially inward of the lip seal, the depression being concave toward an inside of the annular seal part.

* * * * *